US011988017B2

(12) United States Patent
Wunderlich

(10) Patent No.: US 11,988,017 B2
(45) Date of Patent: May 21, 2024

(54) KEY BLANK AND KEY FOR ACTUATING A DISK CYLINDER AND METHOD OF MANUFACTURING SUCH A KEY BLANK AND KEY

(71) Applicant: ABUS August Bremicker Söhne KG, Wetter-Volmarstein (DE)

(72) Inventor: Frank Wunderlich, Netphen (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 407 days.

(21) Appl. No.: 17/335,171

(22) Filed: Jun. 1, 2021

(65) Prior Publication Data

US 2021/0381275 A1 Dec. 9, 2021

(30) Foreign Application Priority Data

Jun. 8, 2020 (DE) ......................... 102020115134.9

(51) Int. Cl.
*E05B 19/00* (2006.01)
*E05B 29/00* (2006.01)

(52) U.S. Cl.
CPC ...... *E05B 19/0052* (2013.01); *E05B 29/0013* (2013.01)

(58) Field of Classification Search
CPC ............. E05B 19/0017; E05B 19/0041; E05B 19/0052; E05B 29/0013; E05B 29/0066
See application file for complete search history.

(56) References Cited

U.S. PATENT DOCUMENTS

| | | | | |
|---|---|---|---|---|
| 1,707,642 | A | 4/1929 | Segal | |
| 3,695,073 | A * | 10/1972 | Prescott | E05B 21/066 70/366 |
| 3,974,670 | A | 8/1976 | Wolter | |
| 4,111,021 | A | 9/1978 | Roberts | |
| 5,570,601 | A | 11/1996 | Field | |
| 5,613,389 | A * | 3/1997 | Hauser | E05B 29/0013 70/366 |
| 6,725,696 | B1 * | 4/2004 | Blight | E05B 29/0013 70/369 |
| 6,799,447 | B2 * | 10/2004 | Mielonen | E05B 21/066 70/366 |
| 8,656,746 | B2 * | 2/2014 | Buhl | E05B 21/066 70/377 |
| 8,689,595 | B2 * | 4/2014 | Martikainen | E05B 19/0017 70/377 |
| 9,447,607 | B2 * | 9/2016 | Malinen | E05B 29/0066 |
| 10,006,224 | B2 * | 6/2018 | Wehr | E05B 29/0013 |
| 10,240,364 | B2 * | 3/2019 | Wehr | E05B 29/0013 |

(Continued)

FOREIGN PATENT DOCUMENTS

| | | | |
|---|---|---|---|
| DE | 102011015314 | A1 | 10/2012 |
| DE | 102014108355 | A1 | 12/2015 |

(Continued)

*Primary Examiner* — Christopher J Boswell
(74) *Attorney, Agent, or Firm* — Dickinson Wright PLLC

(57) ABSTRACT

A key blank for manufacturing a key for a disk cylinder having rotatable disk tumblers has a key shaft that extends along a longitudinal axis. The key shaft further has a plurality of notches that extend transversely to the longitudinal axis, that extend at equal spacings from one another, and that have the same depth. In a key, these notches may form chamfers of drive slopes for driving the disk tumblers.

19 Claims, 12 Drawing Sheets

(56) References Cited

U.S. PATENT DOCUMENTS

| | | | | |
|---|---|---|---|---|
| 10,358,842 | B2 * | 7/2019 | Wehr .................... | E05B 21/066 |
| 10,619,379 | B2 * | 4/2020 | Baumhauer ......... | E05B 19/0035 |
| 11,193,304 | B2 * | 12/2021 | Riesel ..................... | E05B 35/06 |
| 2013/0000367 | A1 | 1/2013 | DeWalch | |

FOREIGN PATENT DOCUMENTS

| | | | |
|---|---|---|---|
| DE | 102014119676 | A1 | 6/2016 |
| DE | 102016114222 | A1 | 2/2018 |
| EP | 0213069 | A2 | 3/1987 |
| EP | 0488618 | A1 | 6/1992 |
| EP | 0712979 | B1 | 2/2000 |
| EP | 0989262 | A2 | 3/2000 |
| EP | 1279788 | A1 | 1/2003 |
| EP | 1767730 | A1 | 3/2007 |

* cited by examiner

KEY BLANK AND KEY FOR ACTUATING A DISK CYLINDER AND METHOD OF MANUFACTURING SUCH A KEY BLANK AND KEY

CROSS-REFERENCE TO RELATED APPLICATIONS

This application claims the benefit and priority of German Application No. DE 102020115134.9 filed on Jun. 8, 2020. The entire disclosure of the above application is incorporated herein by reference.

FIELD

The present invention relates to a key for a lock cylinder of the type of a disk cylinder and to a key blank for manufacturing such a key. A key blank is provided to manufacture a key for a disk cylinder by forming a plurality of drive slopes or cuts axially offset from one another—as explained in the following. The invention further relates to a method of manufacturing such key blanks and to a method of manufacturing such keys.

BACKGROUND

A disk cylinder comprises a cylinder housing; a cylinder core that is rotatably supported about a cylinder axis in the cylinder housing and that is also designated as a disk housing in this connection; and at least one blocking pin that is provided at the outer periphery of the disk housing, that is aligned in parallel with the cylinder axis, that is displaceable radially to the cylinder axis, that bocks the disk housing against a rotational movement in a radially outer blocking position, and that releases the disk housing for a rotational movement in a radially inner release position. Furthermore, such a disk cylinder comprises a plurality of disk tumblers that are arranged along the cylinder axis in the disk housing and that are rotatably supported between a locked position and an unlocked position, wherein each disk tumbler has a key reception opening and, at the outer periphery, at least one blocking cut-out in which the blocking pin may be at least partly received in the release position. The blocking pin may then only be displaced into the release position when all the disk tumblers are in their unlocked position in which the blocking cut-out of the respective disk tumbler is oriented radially to the blocking pin.

Such a disk cylinder is known from DE 10 2011 015 314 A1 and EP 0 712 979 B1.

In accordance with FIGS. 1 and 2, a disk cylinder 10 may have a cylinder housing 12 and a cylinder core or a disk housing 14 rotatably supported about a cylinder axis Z in the cylinder housing 12. The rotational movement of the disk housing 14 may be transmitted to a locking mechanism of a lock, not shown, via a coupling section 30 connected to the disk housing 14 in order to unlock or lock the lock by means of the disk cylinder 10.

A plurality of rotatable disk tumblers 16, which are also designated as adjustment disks or tumbler disks, are received behind one another in the disk housing 14 behind a securing disk 15 along the cylinder axis Z. The disk tumblers 16 have respective central reception openings 18 that together form a keyway 28 for the introduction of a key 24 and that have a rectangular cross-section in the example shown. The disk tumblers 16 further have respective peripheral cut-outs in the form of blocking cut-outs 20 for receiving a blocking pin 22 that is aligned in parallel with the cylinder axis Z.

The blocking pin 22 is radially movably received in a slot 32 provided in the wall of the disk housing 14. When the disk cylinder 10 is in its closed position and the disk tumblers 16 are thus rotated into their locked position, the blocking pin 22 adopts a radially outer blocking position. In this blocking position, a part section of the blocking pin 22 engages into a blocking pin reception recess 34 provided at the inner wall of the cylinder housing 12 so that the disk housing 14 (apart from a slight of rotary clearance) is blocked against a rotational movement relative to the cylinder housing 12.

The disk tumblers 16 may be transferred from their locked position into an unlocked position by means of the key 24. When all the disk tumblers 16 are in a so-called end sorting position, which lies between the locked position and the unlocked position, the blocking cut-outs 20 of all the disk tumblers 16 are then aligned with one another and oriented radially to the blocking pin 22, viewed in the direction of the cylinder axis Z. The blocking pin 22 may hereby be moved radially inwardly into its release position in which it is located outside the blocking pin reception recess 34 of the cylinder housing 12. The disk housing 14 is thereby released for a rotational movement relative to the cylinder housing 12 and the disk housing 14 may be rotated further in the unlocking direction together with the disk tumblers 16 up to the reaching of the unlocked position.

A fixing cut-out 44 for receiving a core pin 46 may further be provided at the outer periphery of each disk tumbler 16. The core pin 46 is aligned in parallel with the cylinder axis Z and is radially movably received in a slot provided in the wall of the disk housing 14. In the closed position of the disk cylinder 10, the core pin 46 engages into the fixing cut-outs 44 of the disk tumblers 16 and thus prevents a rotation of the disk tumblers 16 with respect to one another when no key 24 is introduced.

The key 24 associated with the disk cylinder 10 has—starting from a corresponding key blank—a plurality of differently angled drive slopes 26 along a key axis S at the key shaft 25 that correspond to different angular positions of the blocking cut-outs 20 of the disk tumblers 16. After the introduction into the keyway 28, the key 24 first adopts a so-called initial position from which the key 24 may be turned in the unlocking direction. By turning the key 24 in the unlocking direction from the initial position, the key 24 first moves into a so-called zero position in which the core pin 46 may move out of engagement with the fixing cut-outs 44 of the disk tumblers 16 and the disk tumblers 16 are thus released for a rotational movement relative to the disk housing 14 to be able to bring the blocking cut-outs 20 of the disk tumblers 16 into alignment one after another (so-called sorting).

The disk tumblers 16 have a specific rotational clearance with respect to the respective associated drive slope 26 of the key 24, the dimension of said rotational clearance depending on the angular dimension of the respective drive slope 26; i.e. outer edges or side edges of the shaft 25 of the key 24 and corresponding cam sections of the central reception openings 18 of the associated respective disk tumblers 16 come into engagement with one another at different points in time or at different angular positions during the sorting in dependence on the angular dimension of the notches 26.

For example, starting from the zero position of the disk tumblers 16, the total rotational path of the key 24 up to the reaching of the end sorting position of all the disk tumblers 16 amounts to approximately 110°, i.e. after a rotation of the key 24 by approximately 110°, all the disk tumblers 16 are sorted and the blocking cut-outs 20 are oriented in radial alignment with the blocking pin 22. A pattern of six different angular positions at uniform intervals is typically provided for the possible angular positions of the blocking cut-outs 20, with the angular spacing between two blocking cut-outs 20 that are adjacent in the pattern amounting to approximately 18°. Accordingly, there are six possible encodings for each disk tumbler 16, wherein the respective disk tumbler 16 has to be rotated by a certain angle from its zero position to set one of these encodings. In the exemplary disk cylinder 10, an encoding "1" corresponds to a rotation of the disk tumbler 16 by approximately 20°, an adjacent encoding "2" corresponds to a rotation of approximately 38°, etc. and, finally, an encoding "6" corresponds to a rotation of approximately 110°, in each case measured from the zero position up to the reaching of the end sorting position. When the disk tumblers 16 are in the zero position, the blocking cut-outs 20 are accordingly arranged at an angular spacing from the blocking reception recess 34 of the cylinder housing 12 that corresponds to the respective encoding.

At the encoding "6", a compulsory coupling between the corresponding disk tumbler 16 and the associated section of the key 24 may be provided, i.e. no drive slope is present or a drive slope having the angular dimension 0° is present, so that there is no rotational clearance between the key 24 and the disk tumbler 16.

At the encoding "1", in contrast, there is the largest possible rotational clearance between the key 24 and the disk tumbler 16, i.e. a drive slope 26 having an angular dimension of approximately 90° is provided at the key 24. A disk tumbler 16 of the encoding "1" is thus generally only taken along at the end of the rotational actuation of the key 24, i.e. after a rotation by approximately 90°, and is brought into its end sorting position by a rotation of the key 24 by a further approximately 20°.

A disk cylinder may also have one or more so-called lift disks that are usually disk tumblers. Each lift disk has the encoding "6" and is arranged at a predetermined axial position in the disk housing, e.g. at the very front, at the very rear, or at the center of the lock cylinder 10 with respect to the key introduction direction. The disk tumbler acting as a lift disk has a compulsory coupling with the key 24. On a key actuation in the unlocking direction, the lift disk serves for the coupling of the key 24 to the disk housing 14 after the completion of the sorting (rotation by 110°) and thus effects a rotational entrainment of the disk housing 14. Starting from the release position of the blocking pin 22, the lift disk ensures, on a key actuation in the locking direction, that the blocking pin 22 is properly raised out of the blocking cut-outs 20 of the disk tumblers 16 (i.e. is urged into the blocking pin reception recess 34) and is not canted, for instance.

It is furthermore typical to arrange intermediate disks 36 between the disk tumblers 16, said intermediate disks 36 being coupled to the disk housing 14 in a rotationally fixed manner or with a rotational clearance. The intermediate disks 36 decouple adjacent disk tumblers 16 from one another so that the rotational movement of a respective disk tumbler 16 does not effect a co-rotation of the disk tumbler 16 adjacent thereto due to friction. Such an entrainment could namely have the result that a disk tumbler 16 is under certain circumstances rotated beyond its unlocked position and the lock cylinder 10 may thus no longer be opened.

The rotationally fixed coupling of the intermediate disks 36 to the disk housing 14 may take place through abutment sections 40 of the intermediate disks 36 that extend at least partly in the radial direction (FIG. 2) and that contact corresponding projections 42 formed at the inner wall of the disk housing 14. Each intermediate disk 36 has a peripheral cut-out 38 that is radially aligned with the blocking pin 22. Each intermediate disk 36 accordingly has a further peripheral cut-out **38*a* that is radially aligned with the core pin 46 and that is preferably disposed diametrically opposite the peripheral cut-out 38**.

Disk cylinders of the above-described type have proved to be advantageously secure against manipulation. Accordingly, there is a need for keys for such disk cylinders that enable a comfortable actuation of the disk cylinders.

SUMMARY

It is therefore an object of the invention to provide a key for a disk cylinder and possibilities for manufacturing such keys to be able to achieve a comfortable handling of the keys on the actuation of a disk cylinder.

This object is satisfied by a key blank having the features of claim 1 that may be provided for manufacturing a key for a disk cylinder having disk tumblers. The object is in particular satisfied in that the key blank has a key shaft that extends along a longitudinal axis and that has a plurality of notches that extend transversely to the longitudinal axis, that extend at equal spacings from one another, and that have the same depth.

The key blank thus has a plurality of notches along the key shaft that could also be designated as grooves or cuts and that extend transversely to the longitudinal axis. These notches may in particular be arranged adjacent to one another and/or may be aligned in parallel with one another. The notches may in particular extend in a respective normal plane of the longitudinal axis such that the notches may extend perpendicular to the longitudinal axis.

By means of these notches, the key shaft of the key blank may in particular be prepared to manufacture a key for actuating a disk cylinder from the key blank by a subsequent forming of drive slopes for coding the key and, if necessary, by further manufacturing steps, for example by forming a grip section. The notches may, for example, be produced by incisions or cuts into the key shaft, in particular by means of a pointed tool extending transversely across a back of the key shaft. The notches may thereby in particular be formed with flanks inclined relative to the longitudinal axis or may be formed as converging to a point. The drive slopes may thereupon, for example, be formed at the key blank by milling or cutting, wherein a plurality of drive slopes may be formed one after another in accordance with the mutual spacing of the notches along the longitudinal axis of the key shaft.

Therefore, in order to manufacture an encoded key on the basis of the key blank, the drive slopes may be selectively worked into the key shaft, wherein a drive slope is not absolutely necessary at all possible positions along the key shaft, and wherein the drive slopes may have different orientations and depths corresponding to the desired respective encoding. The regular arrangement of notches along the key shaft may serve as a pattern for the drive slopes. At least some of the drive slopes, in particular those that extend up to a back of the key shaft, may in this respect form cuts into the notches so that the notches or their flanks may form chamfers for edges, which arise at the back of the key shaft on the milling of the drive slopes, or may form bevels.

Due to the preparation of the key blank with notches introduced into the key shaft, it is consequently possible to form edges or bevels that are inclined or that are chamfered in the longitudinal direction instead of the right-angled and usually sharp edges at the outer sides of the key shaft or at a back of the key shaft that remain in common key blanks after the formation of the drive slopes. On the one hand, a smooth and improved introduction of the key into a keyway of a disk cylinder may thereby be achieved, whereas, on the other hand, contacts with sharp edges at the outer sides of the key shaft, which may be unpleasant or painful for a user, may also be prevented during the handling of the key manufactured from the key blank. Any damage to an article of clothing due to such sharp edges at the outer sides of the key, for example to a trouser pocket in which the key is stored or transported, may also be avoided in this way.

The notches may in particular be produced or formed in the same way and may therefore have the same depth, apart from any production tolerances. In general, such a key blank may, in addition to the plurality of notches, also have further recesses that may optionally so-to-say extend transversely to the longitudinal axis.

Further embodiments of the invention can be seen from the dependent claims, from the description, and from the drawings.

The notches may further extend in the peripheral direction of the key shaft, wherein the notches may be provided along the longitudinal axis of the key shaft, in particular in the same peripheral region of the key shaft.

Furthermore, the notches may have the same length with respect to their direction of extent transverse to the longitudinal axis and/or the notches may extend transversely across a back of the key shaft.

In some embodiments, transversely to the longitudinal axis of the key shaft the notches may extend in a straight line or in a curved manner with respect to the longitudinal axis. Alternatively or additionally, provision may be made in some embodiments that each of the notches extends in a normal plane to the longitudinal axis. The notches may in particular extend in parallel with one another.

The key shaft may, for example, be rectangular in cross-section and/or may have two sides that are opposed to one another and aligned in parallel with one another so that the notches may extend in a straight line transversely to the longitudinal axis across one of these sides or a back of the key shaft formed by this side.

The key shaft may further, for example, be at least sectionally curved in cross-section and may in particular sectionally have the shape of an arc of a circle, wherein the notches may be formed at such a curved side or at a curved back of the key shaft. The notches may in this respect also be formed in a straight line so that the depth of a respective notch may vary along its direction of extent transverse to the longitudinal axis of the key shaft with respect to the back of the key shaft. For example, the notches may have a maximum depth in a central section with respect to the direction of extent, wherein the plurality of notches may have the same maximum depth. Alternatively thereto, the notches may also extend in a curved manner, in particular corresponding to any curvature of a back of the key shaft, so that the notches may also have a constant depth with respect to the back along their direction of extent when a back of the key shaft is formed in a curved manner transversely to the longitudinal direction.

In some embodiments, the notches may be V-shaped in a sectional plane that extends in parallel with the longitudinal axis of the key shaft. Alternatively, or in the case of a V-shaped formation, the notches may have two flanks in a sectional plane that extends in parallel with the longitudinal axis of the key shaft, said two flanks being oriented at an acute angle to the longitudinal axis of the key shaft, wherein the angle is in particular in a range from 30° to 60° and preferably amounts to 45°. The flanks impact one another in a lower section of the notches and may form a V shape of the notches in a sectional plane in parallel with the longitudinal axis or may be connected to one another by a base section of the notches that may, for example, be aligned in parallel with the longitudinal axis or may be curved.

Such a formation of the notches with inclined flanks and in particular a V-shaped formation of the notches may be produced in a simple manner by piercing using a pointed tool. The flanks inclined with respect to the longitudinal axis may in particular serve to form chamfers of edges that arise due to the forming of drive slopes at the key blank in order to avoid sharp edges at a back of the key shaft due to such bevels. The flanks may further extend along a transverse direction, in particular perpendicular to the longitudinal axis, wherein the transverse direction may be rectilinear or curved.

In some embodiments, the depth of the notches along a vertical axis of the key shaft perpendicular to the longitudinal axis may amount to at most 15% of the height of the key shaft. The notches may thus merely form slight recesses at the key shaft to be able to chamfer edges, which arise on the production of drive slopes, along a transverse direction without thereby impairing the forming of the drive slopes. Furthermore, due to the shallow depth, the notches may in particular be formed as narrow along the longitudinal axis in the case of a V-shaped formation and/or in the case of flanks oriented at an acute angle to the longitudinal axis so that the key shaft or a back of the key shaft only experiences slight changes through the forming of the notches.

In some embodiments, the key shaft may have at least five notches, in particular at least six notches, at least seven notches, or at least eight notches. Furthermore, in some embodiments, the key shaft may have exactly five notches, exactly six notches, exactly seven notches, or exactly eight notches. This may in particular enable the forming of a common number of drive slopes having a common width at the key blank, wherein provision may in particular be made to form the drive slopes between two notches of the plurality of notches that are outer notches with respect to the longitudinal axis.

In some embodiments, the key shaft may have two mutually opposed broad sides extending along the longitudinal axis and two mutually opposed narrow sides extending along the longitudinal axis, wherein the notches may be formed at at least one of the narrow sides. The notches may in particular be formed at both narrow sides of the key shaft.

The narrow sides may be arranged opposite one another with respect to a vertical axis extending perpendicular to the longitudinal axis and the broad sides may be arranged opposite one another with respect to a transverse direction that extends perpendicular to the longitudinal axis and perpendicular to the vertical axis. The narrow sides may be formed with a width that is defined by the extent in the transverse direction and that may in particular be smaller than a height of the broad sides that is defined by the extent along the vertical axis. The two narrow sides may in particular merge into the broad sides at respective end sections. The key blank may thus be formed as narrow to be able to introduce the key manufactured therefrom into a narrow keyway of a disk cylinder.

In some embodiments, the narrow sides may be curved and may in particular be formed in the shape of an arc of a circle in a sectional plane that extends perpendicular to the longitudinal axis of the key shaft. Alternatively, the narrow sides may be formed in a straight line. The broad sides may substantially extend in a plane defined by the vertical axis and by the longitudinal axis and may, for example, only have a cut-out in a central section, said cut-out extending along the longitudinal axis and being able to serve to guide a key to be manufactured from the key blank in a keyway. Furthermore, different types of designs and/or orientations of the broad sides may generally also be provided. For example, the key blank may be waisted or Z-shaped in cross-section such that the broad sides may be concave or may be oriented inclined to the vertical axis.

In some embodiments, the at least one narrow side may merge into the one broad side at a first end section and into the other broad side at a second end section, wherein the notches may extend transversely across the narrow side from the first end section to the second end section. The notches may thus completely span the narrow side in the transverse direction. The notches formed at the one narrow side may in particular be formed as converging to a point in the direction of the other, oppositely arranged narrow side. This may also make it possible to use the flanks of the notches as chamfered edges or bevels at an outer side, in particular at a narrow side, of the key shaft to enable a smooth introduction of the key formed from the key blank into a keyway and a comfortable handling of the key.

In particular a key blank formed with two narrow sides and two broad sides may be suitable for manufacturing a key for a disk cylinder in that, for example, an orientation in which the key may be introduced into a keyway may be directly visible for a user due to such a profile. In this respect, such keys in particular require a possibility for a comfortable handling and the invention therefore also independently relates to a key blank for manufacturing a key for a disk cylinder having disk tumblers, said key blank having two mutually opposed broad sides extending along a longitudinal axis and two mutually opposed narrow sides extending along the longitudinal axis, wherein a plurality of notches extending transversely to the longitudinal axis are formed at at least one of the narrow sides. The notches may in this respect in particular have the features and properties explained herein, above and below.

In some embodiments, the notches may form edges of drive slopes that are to be formed and/or that are already formed for driving the disk tumblers. One flank of a respective notch may in this respect in particular form such an inclined edge of a drive slope, while the other flank may be removed during or as a result of the formation of the drive slope. For this purpose, a drive slope may, for example, be formed as a cut into a notch, wherein a boundary of the drive chamber that is an axial (front or rear) boundary with respect to the longitudinal axis may in particular extend centrally through the notch and/or through a lower point of the notch. A drive slope may in particular be formed as a cut into a respective half of two mutually adjacent notches.

In some embodiments, each of the plurality of notches formed at the one narrow side may have a respective notch correspondingly formed at the other narrow side associated with it, wherein the respective mutually associated notches may in particular be arranged at the same level along the longitudinal axis of the key shaft and/or may be arranged disposed diametrically opposite one another with respect to the longitudinal axis. The key shaft may thus be provided with mutually associated notches at both sides or at both narrow sides so that inclined edges of drive slopes formed or to be formed thereat may be produced at both sides. A key to be manufactured from such a key blank may in particular be formed as rotationally symmetrical with respect to rotations by 180° due to the arrangement of the mutually associated notches at one level with respect to the longitudinal axis so that the key may in this respect be introduced in any desired orientation into a keyway for actuating a disk cylinder.

The invention further relates to a key for actuating a disk cylinder having a plurality of rotatable disk tumblers. The key comprises a key shaft that extends along a longitudinal axis and that has a vertical axis oriented perpendicular to the longitudinal axis, wherein the key shaft has a plurality of drive slopes for driving the disk tumblers that are arranged next to one another along the longitudinal axis, that are aligned in parallel with the longitudinal axis, and that are oriented at different angles obliquely to the vertical axis of the key shaft. The drive slopes in this respect form recesses with respect to a back of the key shaft. The back of the key shaft has chamfers that adjoin at least some of the drive slopes.

The key may in particular be formed from a correspondingly machined key blank in accordance with any one of the above-mentioned embodiments.

The drive slopes may form an encoding of the key through respective differently oblique orientations in order to enable a sorting of the correspondingly encoded disk tumblers of a disk cylinder to be actuated by means of the key. The drive slopes may in particular be formed, for example milled or cut, between the notches of a key blank of the above-described type. The chamfers may in particular be formed by flanks of the notches remaining after the machining and may form bevels to chamfer edges of the chamfers at the back of the key shaft. This may enable a smooth introduction of the key into a keyway of the disk cylinder as well as a comfortable handling.

However, it is not necessary for all the drive slopes to adjoin one chamfer or two chamfers of the key shaft. Depending on the desired respective encoding, the drive slopes may have different orientations and depths and, depending on the orientation and depth, the respective drive slope may at all extend up to the back of the key shaft and may adjoin a chamfer there.

In some embodiments, the chamfers may extend transversely to the longitudinal axis of the key shaft and may be oriented obliquely to the longitudinal axis, in particular at an angle that is in a range from 30° to 60° and that preferably amounts to 45°. In the direction of a key tip with which the key may be introduced into a key introduction opening of a disk cylinder, the chamfers may in this respect in particular be formed as deepening along the longitudinal axis or as sloping with respect to the vertical axis to facilitate the introduction and alignment of the key in a keyway. Alternatively or additionally, in a direction facing away from the key tip, the chamfers may be formed as deepening along the longitudinal axis or as sloping with respect to the vertical axis to facilitate the removal of the key from a keyway.

In some embodiments, the chamfers may form a flank that is oriented at an acute angle to the longitudinal axis of the key shaft in a sectional plane that extends in parallel with the longitudinal axis of the key shaft. This angle may in particular be in a range from 30° to 60° and may, for example, amount to 45°.

The chamfers may furthermore be oriented inclined to a normal plane of the longitudinal axis.

In some embodiments, transversely to the longitudinal axis of the key shaft the chamfers may extend in a straight line or in a curved manner with respect to the longitudinal axis. Furthermore, in some embodiments, each of the chamfers may substantially extend in a normal plane to the longitudinal axis of the key shaft (and may in this respect, as explained, be oriented obliquely to the longitudinal axis). The chamfers may in particular be aligned in parallel with one another and may be oriented perpendicular to the longitudinal axis of the key shaft.

In some embodiments, the depth of the chamfers along the vertical axis of the key shaft may amount to at most 15% of the height of the key shaft. Accordingly, the chamfers may form inclined edges of the drive slopes that extend transversely to the longitudinal axis, in particular across a back of the key shaft, while the drive slopes may form deeper-reaching recesses of the key shaft.

In some embodiments, the key shaft may have two mutually opposed broad sides extending along the longitudinal axis and two mutually opposed narrow sides extending along the longitudinal axis, wherein the chamfers may be formed at at least one of the narrow sides. The chamfers may be formed at both narrow sides of the key shaft. The key shaft may thus be elongate in cross-section, for example rectangular or substantially rectangular with curved narrow sides and/or curved broad sides, to be able to be introduced into a narrow keyway. The narrow sides may in particular extend along the longitudinal axis and may be formed in a curved manner, for example in the shape of an arc of a circle, in a cut surface oriented perpendicular to the longitudinal axis. The back of the key shaft at which the chamfers are formed may also extend in a curved manner and/or in the shape of an arc of a circle in a sectional plane oriented perpendicular to the longitudinal axis.

Furthermore, in some embodiments, each of the drive slopes may have a planar drive region. However, a transition region of the drive slopes disposed in the peripheral direction of the key shaft may also be curved or rounded so that the drive slopes may, for example, merge uniformly into a rounded back of the key shaft in the transition region. The drive region may in particular serve to move or drive the disk tumblers during a sorting.

The drive slopes may in particular be formed between the notches of a key blank of the type described above and the chamfers may be formed by flanks of such notches. In this respect, a respective drive slope may be provided between two notches of the key blank that are adjacent to one another along the longitudinal axis.

The invention further relates to a cylinder lock comprising a disk cylinder and a key as disclosed herein, wherein the disk cylinder has a plurality of disk tumblers along a cylinder axis that are rotatable about the cylinder axis and a blocking pin that is aligned in parallel with the cylinder axis and that is displaceable radially to the cylinder axis, wherein each disk tumbler has a central reception opening for receiving the key and a peripheral cut-out for receiving the blocking pin. The reception openings of the disk tumblers may in this respect be arranged in alignment with one another and form a keyway into which the key for actuating the disk cylinder may be introduced.

In some embodiments of the disk cylinder, provision may be made that the blocking pin blocks the cylinder core against a rotational movement in a radially outer blocking position and releases the cylinder core for a rotational movement in a radially inner release position. The disk tumblers may in this respect be rotatable between a locked position and an unlocked position, wherein the blocking pin may only be displaceable into the release position when all the disk tumblers are in their unlocked position in which the peripheral cut-out of the respective disk tumbler is oriented radially to the blocking pin. The key may be configured such that the disk tumblers are sortable by means of the drive slopes to be able to arrange the peripheral cut-outs of the disk tumblers along the cylinder axis in alignment with one another and radially to the blocking pin in their respective unlocked positions.

The invention further relates to a method of manufacturing a key blank that serves for the manufacture of a key for a disk cylinder having rotatable disk tumblers, comprising the steps:

- providing a key shaft that extends along a longitudinal axis; and
- forming a plurality of notches at the key shaft that extend transversely to the longitudinal axis, that extend at equal spacings from one another, and that have the same depth. In this respect, the key blank may in particular be configured as disclosed herein.

The notches may in particular be formed to be able to produce chamfered edges or chamfers on a subsequent formation of drive slopes for coding the key, said chamfered edges or chamfers enabling a smooth introduction of the key to be manufactured from the key blank and a comfortable handling of said key. In a subsequent step of manufacturing the key blank, drive slopes may accordingly be formed, in particular milled.

The invention also relates to a method of manufacturing a key for actuating a disk cylinder having a plurality of rotatable disk tumblers. The method comprises the following steps:

- providing a key shaft that extends along a longitudinal axis and that has a vertical axis oriented perpendicular to the longitudinal axis;
- forming a plurality of notches at the key shaft that extend transversely to the longitudinal axis and that have the same depth, wherein the notches are in particular formed as in a key blank of the type disclosed herein; and
- forming a plurality of drive slopes that are arranged next to one another along the longitudinal axis, that are aligned in parallel with the longitudinal axis, and that are oriented at different angles obliquely to the vertical axis of the key shaft, wherein the position of the drive slopes is selected such that at least some of the drive slopes form cuts into the notches and such that at least some of the notches hereby form chamfers adjoining the drive slopes. In this respect, the drive slopes and/or the chamfers may in particular be formed as in a key of the type disclosed herein.

The drive slopes that form cuts into the notches may in particular be formed such that a boundary of the drive slope that is an axial boundary with respect to the longitudinal axis of the key shaft passes through a central section of the respective notch and the remaining flank of the notch forms said chamfer. Furthermore, a grip section may be formed at the key shaft or the key shaft may be provided with and/or connected to a grip section.

DRAWINGS

The invention will be explained in the following by way of example with reference to an embodiment and to the drawings.

Figure 4A:
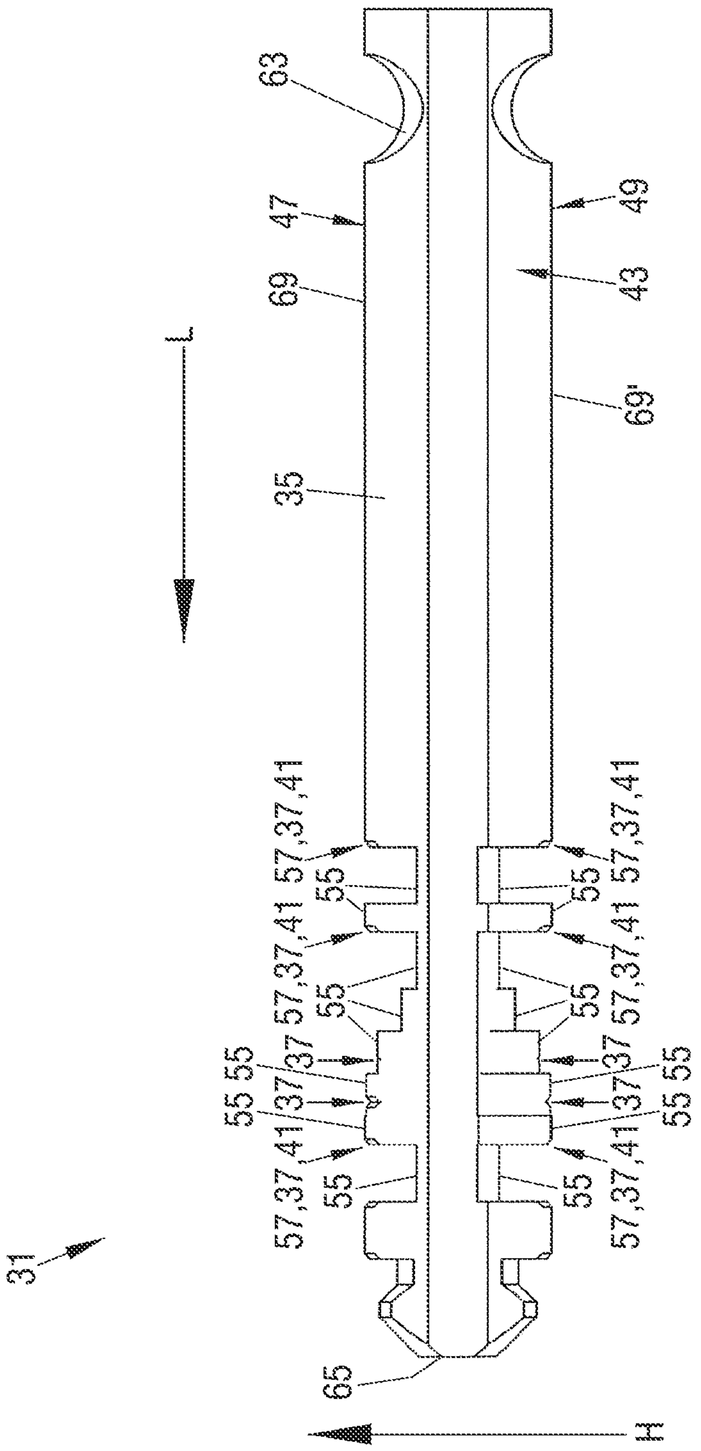
Figure 4B:
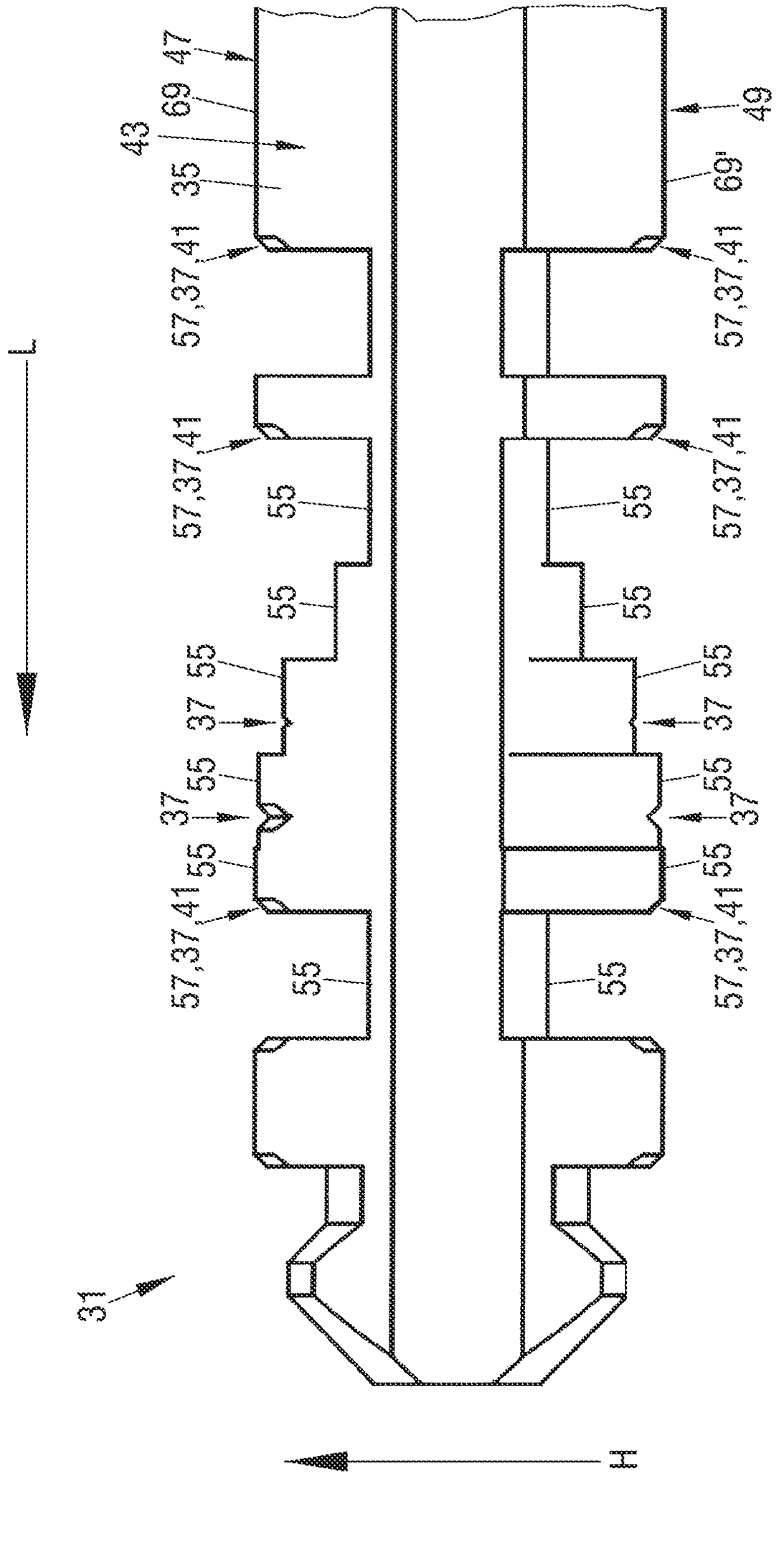

FIGS. 3A to 3D include a longitudinal view of a key blank of the type disclosed herein with a key shaft, a detailed view of a front section of the key blank, a detailed view of a section of a back of the key shaft for illustrating notches formed thereat, and a front view of the key blank;

FIGS. 4A and 4B include a longitudinal view of the key blank with drive slopes formed, and a detailed view of the front section of the key blank; and FIGS. 5A to 5D include a longitudinal view of a key manufactured from the key blank for actuating a disk cylinder, a perspective view of the key, a perspective detailed view of a front section of the key, and a further perspective detailed view for illustrating chamfers adjoining the drive slopes.

Figure 2:
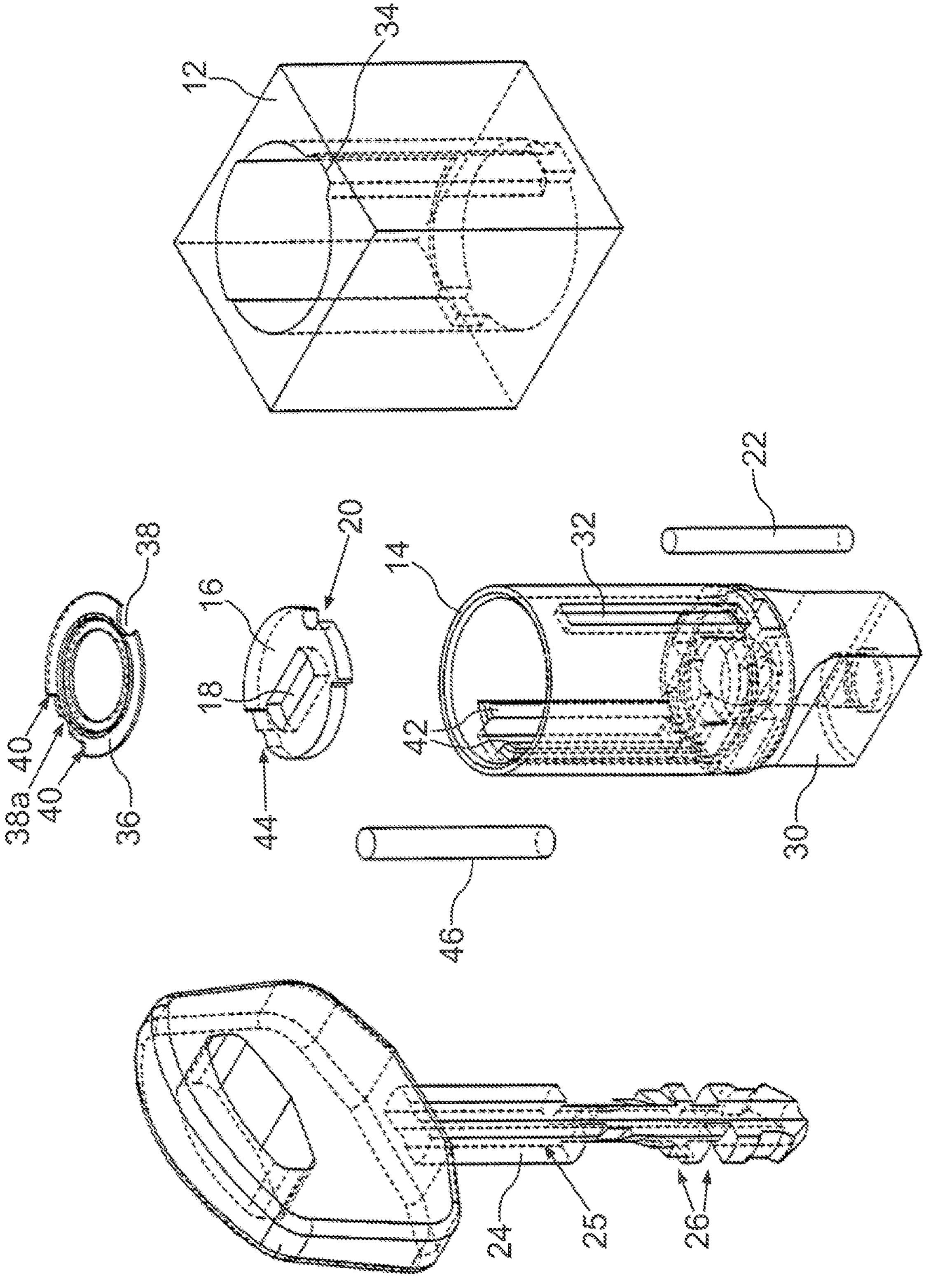
FIG. 2 is an exploded view of parts of the disk cylinder with a key in accordance with FIG. 1.
Figure 3A:
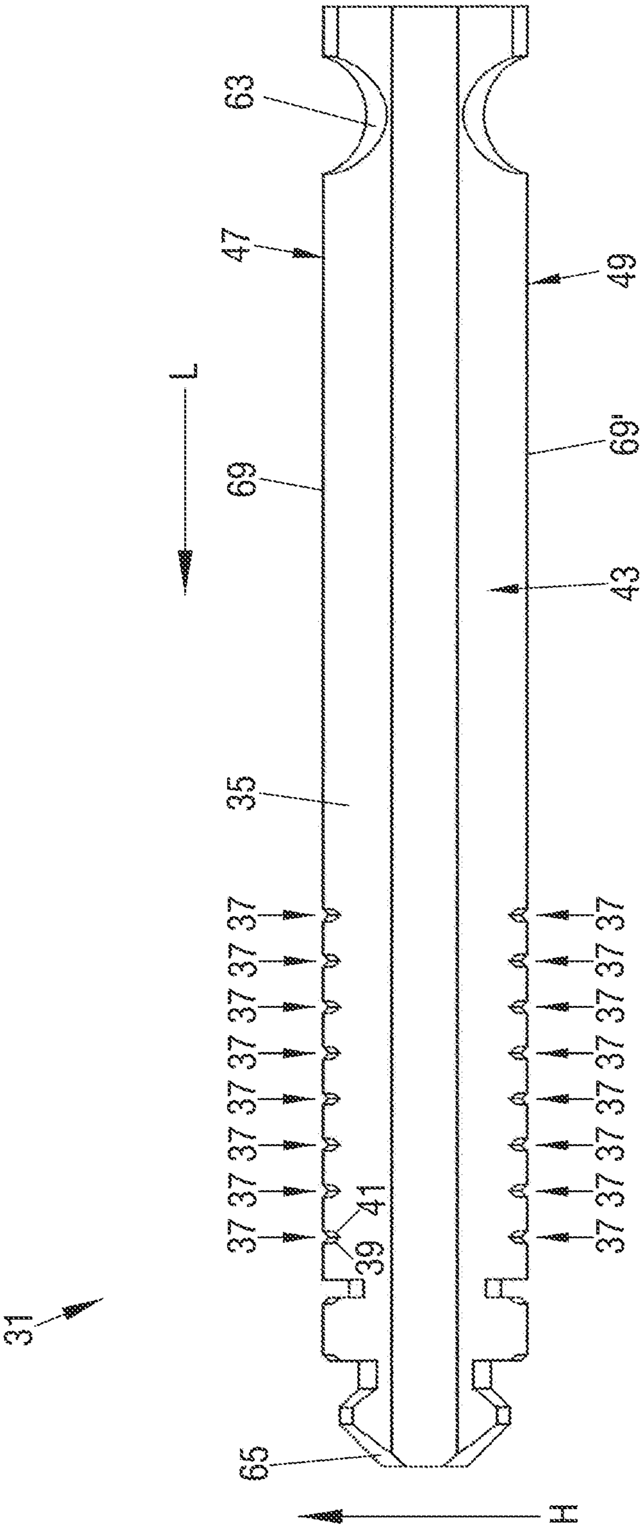
Figure 5A:
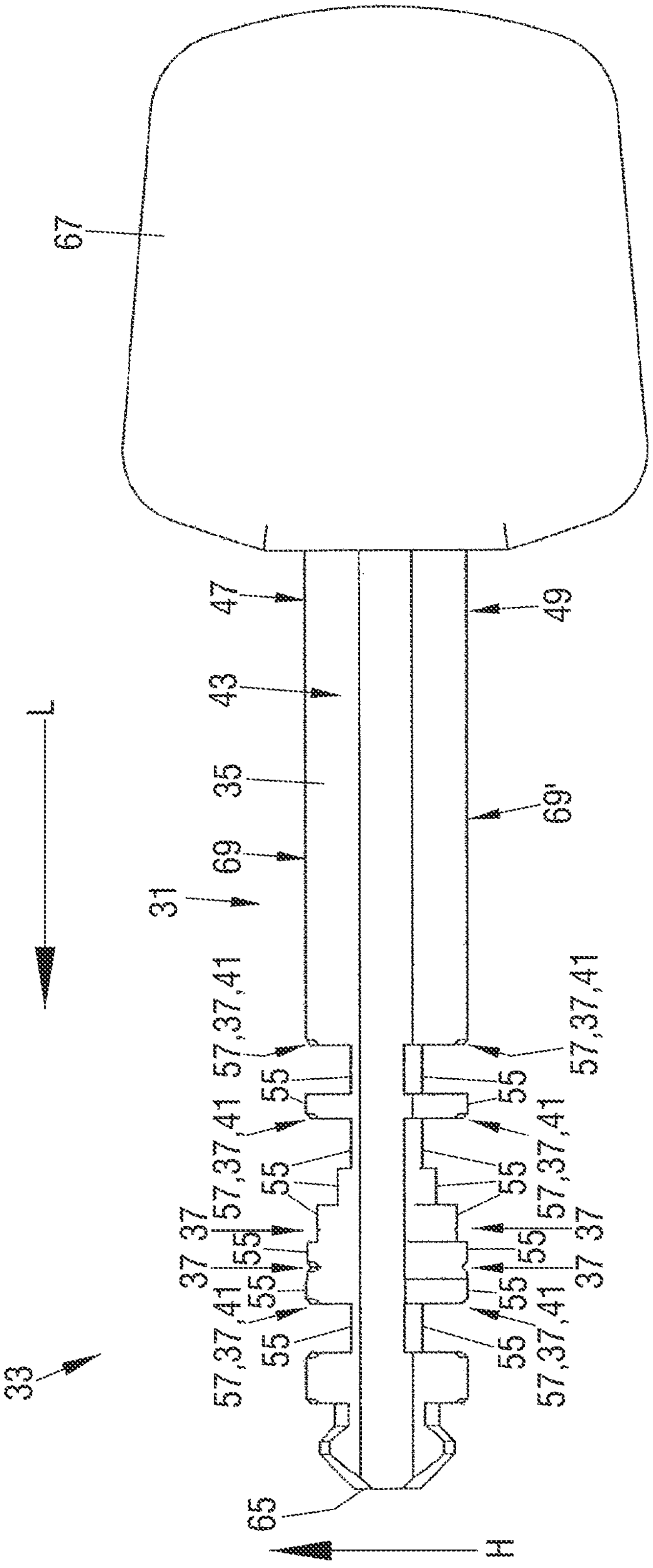
Figure 5B:
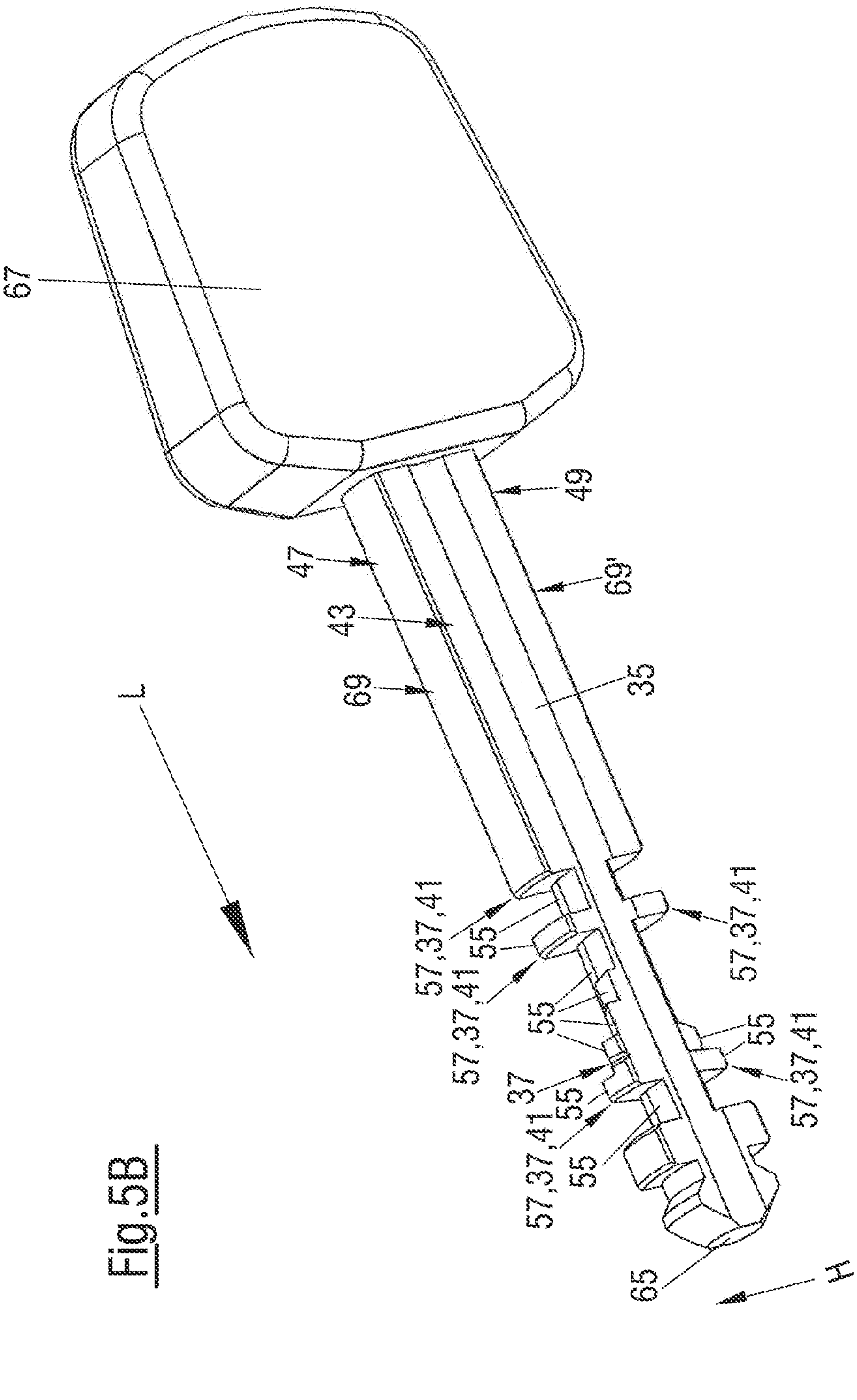
Figure 5C:
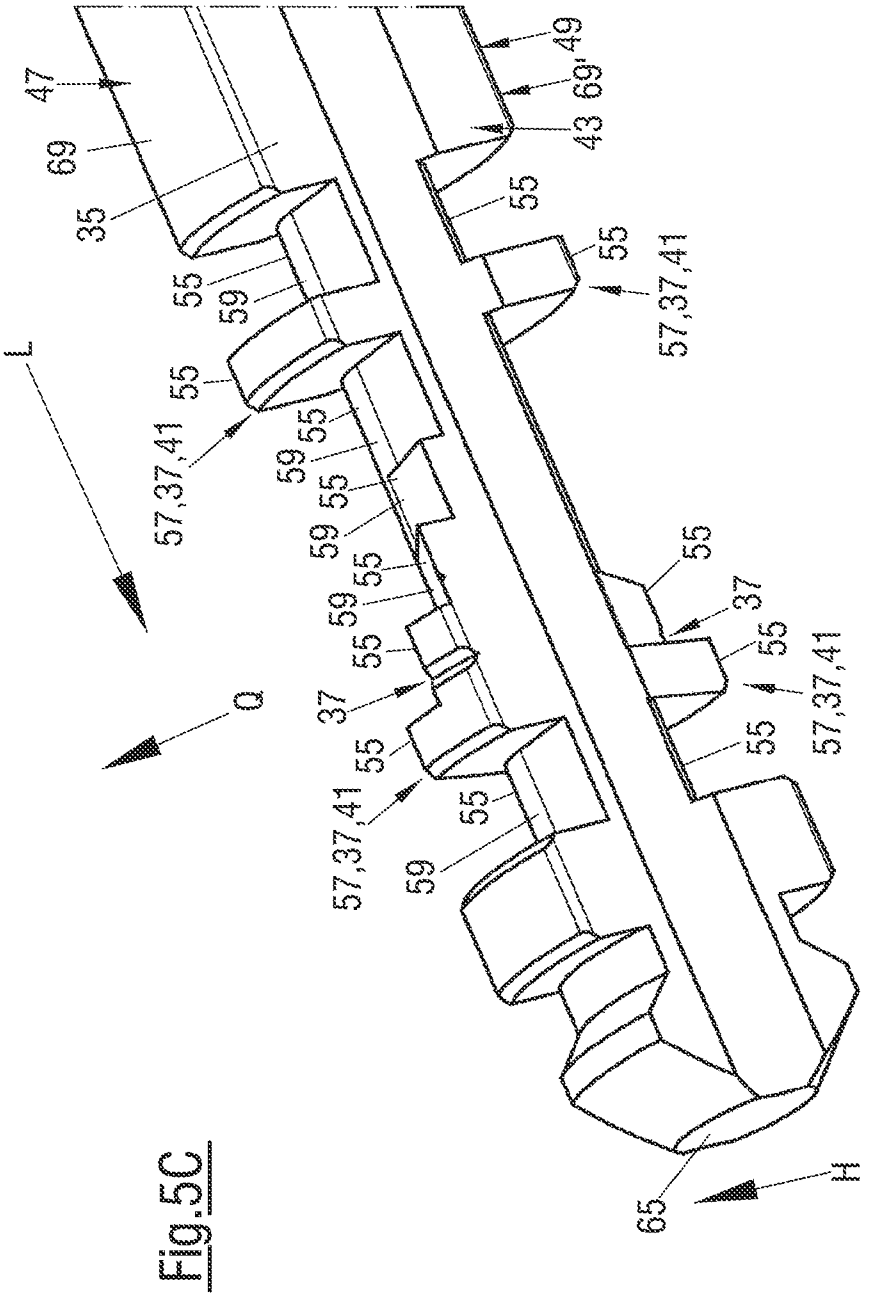

FIG. 3A shows a key blank 31 for manufacturing a key 33 that is shown in FIGS. 5A and 5B. This key 33 may be provided to actuate a disk cylinder 10 of the type shown in FIGS. 1 and 2 and explained in the introduction and to sort its disk tumblers 16 to be able to arrange the blocking pin 22 in the peripheral cut-outs 20 of the disk tumblers 16 in a release position and to be able to transmit a further rotation of the key 33 to the disk housing 14. The disk housing 14 may be coupled to a locking mechanism of a lock, which is not shown, via the coupling section 30 so that the lock may be selectively opened or locked by means of the key 33.

Such a key blank 31 may already be machined with respect to some features (e.g. profile, key tip); however, it does not yet have the final encoding of a key 33.

Figure 1:
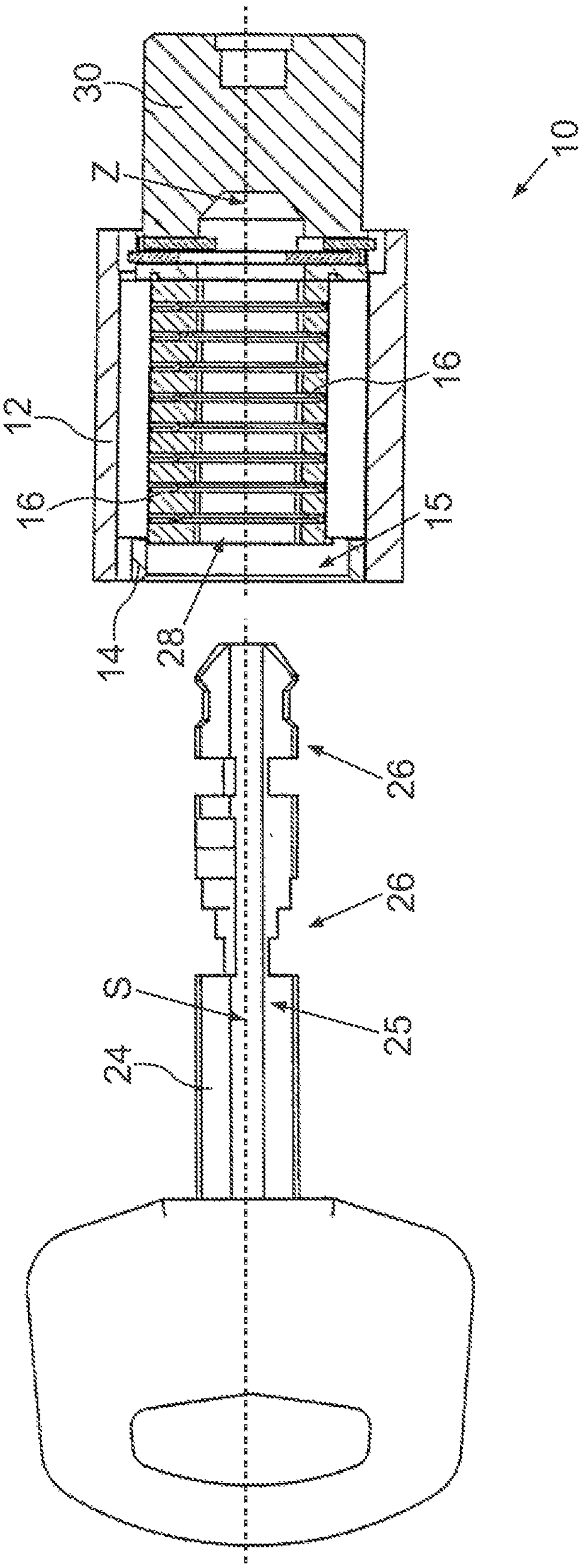
FIG. 1 is a longitudinal sectional view of a disk cylinder with a key.

The key blank 31 shown in FIG. 3A has a key shaft 35 that extends from a connection section 63, which serves to attach a grip section 67 for the key 33 (cf. FIGS. 5A and 5B), along a longitudinal axis L to a key tip 65 with which the key 33 may be introduced into the key introduction opening 19 of the keyway 28 of the disk cylinder 10 (cf. FIGS. 1 and 2). In this respect, the key shaft 35 has a first narrow side 47 extending along the longitudinal axis L and a second narrow side 49 that likewise extends along the longitudinal axis L and that is opposite to the first narrow side 47 with respect to a vertical axis H of the key shaft 35 oriented perpendicular to the longitudinal axis L. At a respective first end section 51, the two narrow sides 47, 49 merge into a first broad side 43 that extends along the longitudinal axis L and that connects the two narrow sides 47 and 49 along the vertical axis H. A second broad side 45 is opposite to the first broad side 43 with respect to a transverse direction Q oriented perpendicular to the longitudinal axis L and to the vertical axis H, wherein the first narrow side 47 and the second narrow side 49 merge into the second broad side 45 at respective second end sections 53 (cf. FIG. 3D).

Figure 3B:
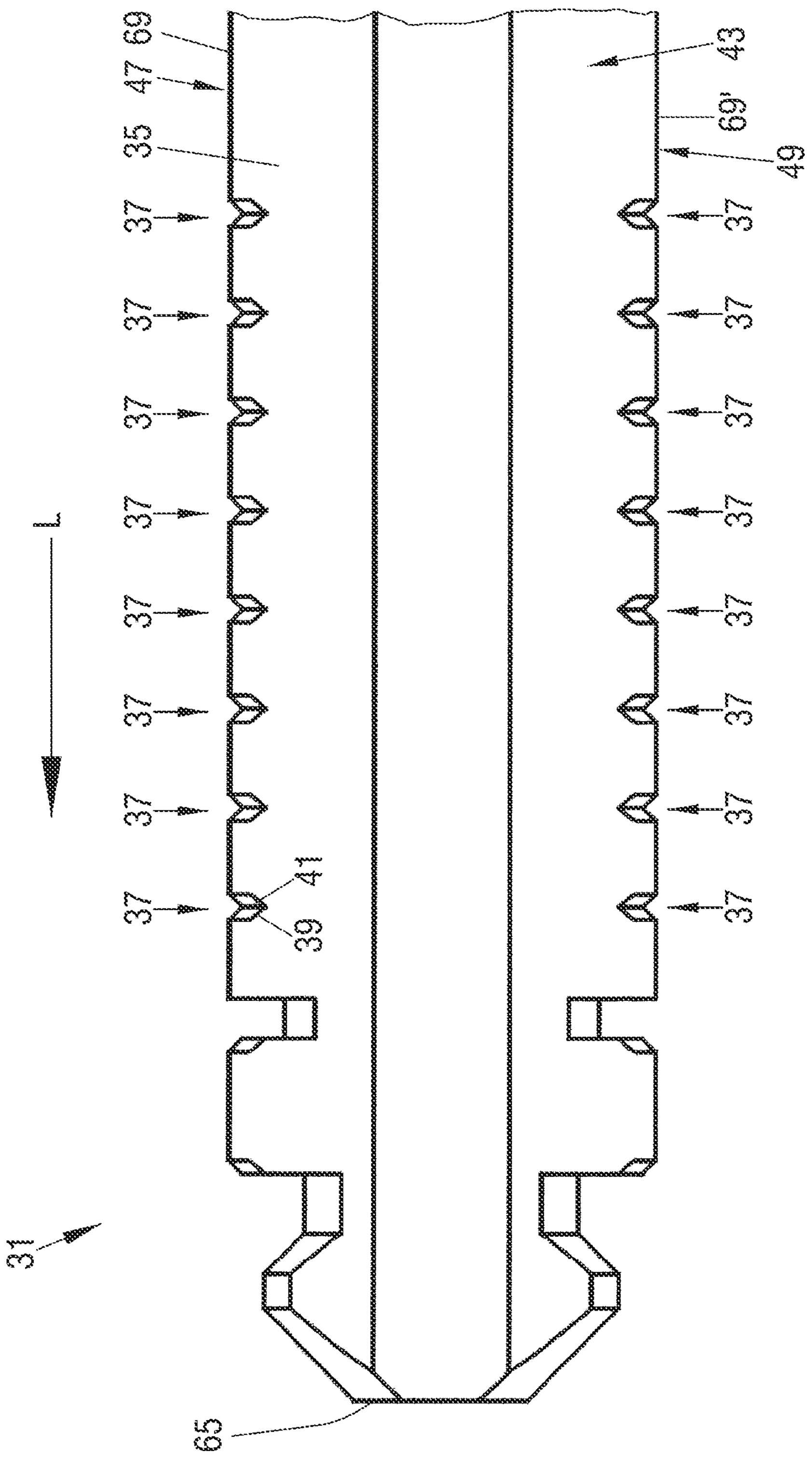
Figure 3C:
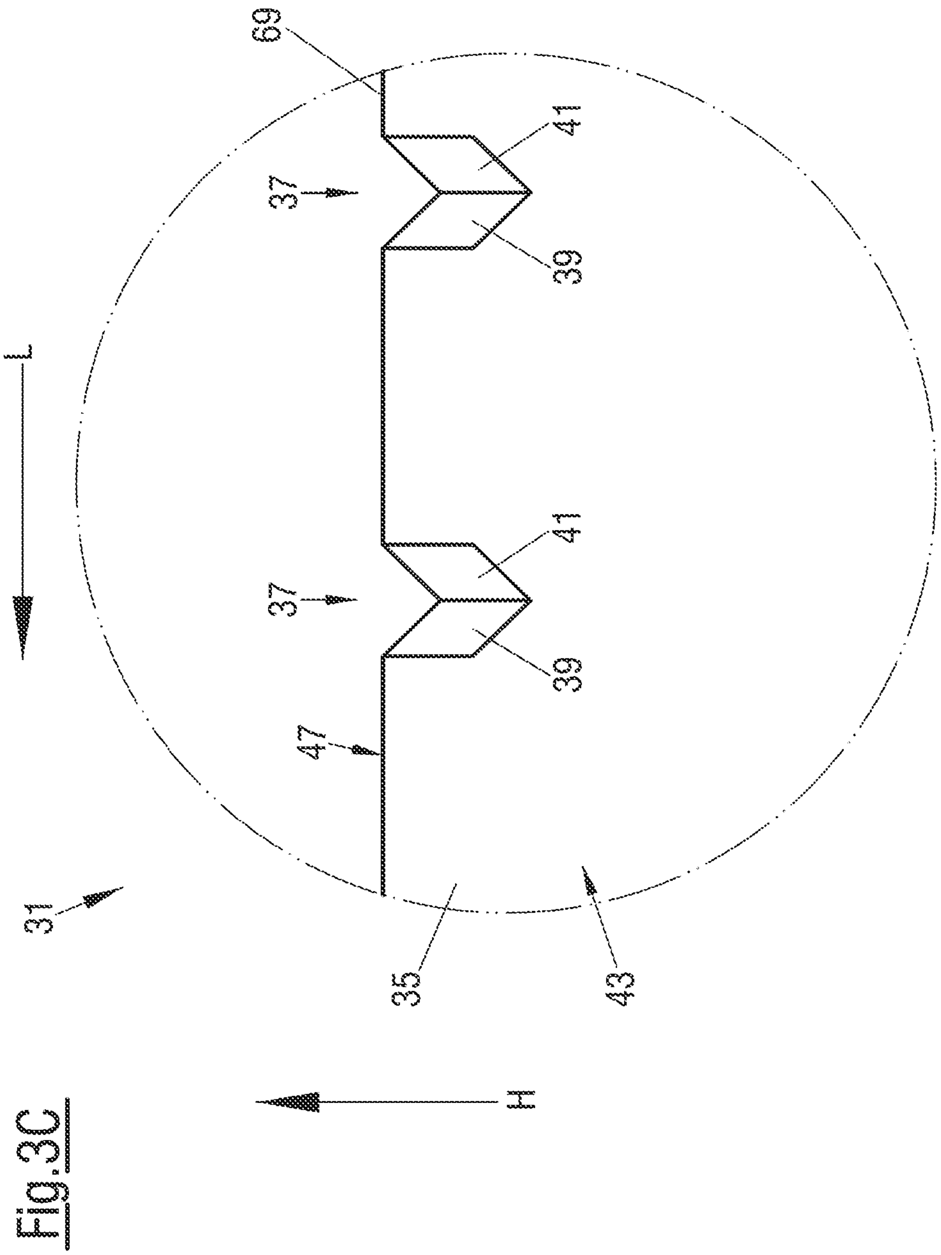
Figure 3D:
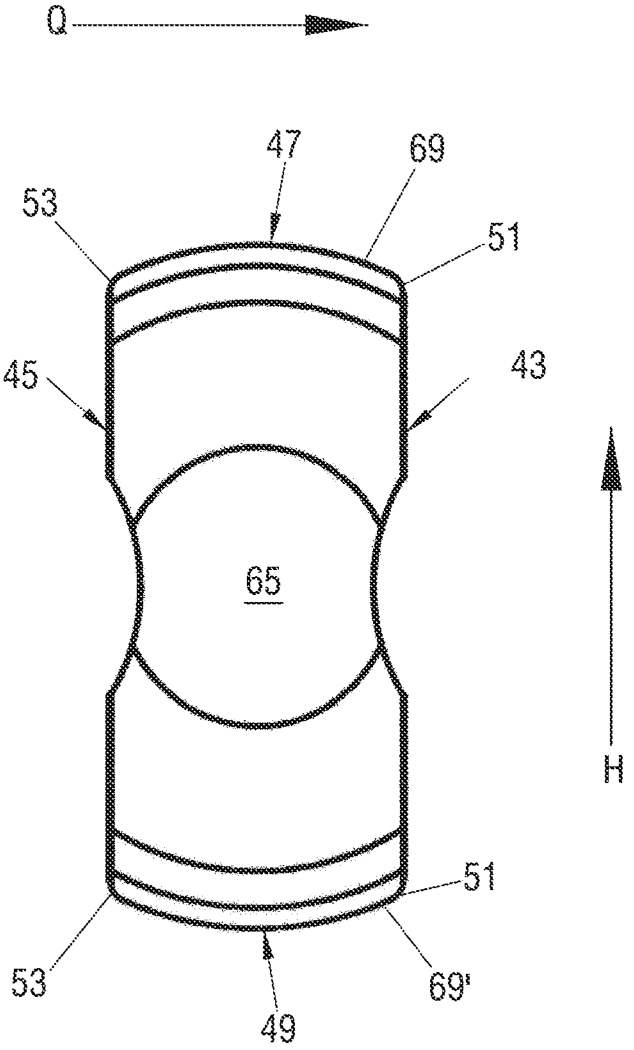

As FIG. 3D shows, the narrow sides 47 and 49 are formed in the shape of an arc of a circle in cross-section or viewed from the key tip 65 along the longitudinal axis L. In contrast, the broad sides 43 and 45 substantially extend along the vertical axis H or in planes in parallel with the vertical axis H, but have a respective cut-out 75 in a central region that extends along the longitudinal axis L as a key guide 77 for orienting the key 33 during the introduction into the key introduction passage 28 (cf. FIGS. 3A, 3B and 3D, FIGS. 4A and 4B, and FIGS. 5A to 5D).

Furthermore, a plurality of notches 37 are formed at the two narrow sides 47 and 49 of the key shaft 35 that form respective mutually opposed backs 69 and 69' as outer sides of the key shaft 35 (cf. FIGS. 3A to 3C). These notches 37 may in particular be formed in a first step of manufacturing the key 33 at the provided key blank 31 and may, for example, be pierced into the backs 69 and 69' by means of a pointed tool. The notches 37 extend transversely to the longitudinal axis L and are arranged at equal spacings from one another with respect to the longitudinal axis L. In the embodiment shown, the notches 37 extend in a respective normal plane of the longitudinal axis L and in parallel with one another along the transverse direction Q oriented perpendicular to the longitudinal axis. Furthermore, all of the plurality of notches 37 have the same depth with respect to the vertical axis H.

Due to the formation of the backs 69 and 69' or of the narrow sides 47 and 49 in the shape of an arc of a circle, the notches 37 extending in a straight line have a varying depth along the transverse direction Q with respect to the respective backs 69 or 69', wherein the depth is at a maximum in a central section with respect to the transverse direction Q. In this respect, all of the plurality of notches 37 have the same maximum depth. Alternatively thereto, the notches 37 may also be curved in cross-section and may in particular extend in the shape of an arc of a circle so that the depth of the notches 37 with respect to the respective back 69 or 69' may also be constant along the transverse direction Q despite the curvature of the backs 69 and 69'.

As can in particular be seen from the detailed view of FIG. 3C, the notches 37 are V-shaped in a sectional plane extending in parallel with the longitudinal axis L and have a respective first flank 39 and a respective second flank 41 that are oriented at an acute angle to the longitudinal axis L. This angle in particular amounts to 45° here, wherein a range of 30° to 60° may generally be provided. Furthermore, an equal number of notches 37 are formed at both narrow sides 47 and 49, wherein each of the notches 37 at the first narrow side 47 has a correspondingly formed notch 37 at the second narrow side 49 associated with it that is at the same level with respect to the longitudinal axis L (cf. in particular FIG. 3B). This may, for example, enable a rotationally symmetrical formation of the key 33 with respect to rotations by 180° (reversible key).

Furthermore, the notches 37 only represent slight cuts or incisions, whose depth amounts to less than 15% of the total height of the key shaft 35 along the vertical axis H, with respect to the extent of the key shaft 35 or of the broad sides 43 and 45 along the vertical axis H. The forming of the notches 37 at the key shaft 35 is therefore accompanied by only a slight adaptation of said key shaft 35 so that in particular the forming of drive slopes 55 or the actuation of a disk cylinder 10 by means of the key 33 manufactured from the key blank 31 is not impaired (cf. also FIGS. 4A to 5D).

In the course of the further machining of the key blank 31 for the manufacture of the key 33, in particular the drive slopes 55 may subsequently be formed at the key blank 31 to provide an encoding of the key 33 for sorting the disk tumblers 16. As FIGS. 4A to 5D show, these drive slopes 55 form recesses with respect to the back 69 or 69' of the key shaft 35 and are formed between the notches 37 with respect to the longitudinal axis L. The drive slopes 55 have a planar drive region 59 to be able to drive the disk tumblers 16 of the disk cylinder 10. In a transition region to the respective narrow side 47 or 49, the drive slopes may, in contrast, have a curved or rounded shape to be able to transition smoothly into the narrow side 47 or 49. For example, the drive slopes 55 may be formed at the key blank 31 by milling.

Some of the drive slopes 55 extend with respect to the vertical axis H up to the respective back 69 or 69', whereas other drive slopes 55 are recessed overall with respect to the backs 69 and 69' (cf. FIGS. 4A to 5D). In this respect, the backs 69 and 69' have chamfers 57 that form edges or bevels of the drive slopes 55 extending up to the backs 69 and 69'.

The chamfers 57 are oriented obliquely at an angle of 45° to the longitudinal axis L and increase in height with respect to the vertical axis H along the longitudinal axis L from the key tip 65 in the direction of the connection section 63 or of the grip section 67. The chamfers 57 may thereby assist an introduction of the key 33 in a keyway 28 of a disk cylinder 10 so that a smooth actuation of the disk cylinder 10 may be achieved. Furthermore, due to these chamfers 57, edges of the milled drive slopes 55 formed at right angles in common keys or key blanks may be chamfered at the backs 69 or 69' to be able to make the handling of the key 33 more comfortable and to be able to avoid sharp edges.

As can in particular be seen from the comparison of FIGS. 3A to 3C with FIGS. 4A to 5D, those ones of the drive slopes 55 that extend up to the backs 69 and 69' are designed as cuts into the notches 37 previously formed at the key blank 31 so that the chamfers 57 are formed by respective second flanks 41 of the respective notches 37. The chamfers 57 are thus automatically produced on the forming of the drive slopes 55 due to the forming of notches 37 at the key blank 31 that had previously taken place.

Figure 5D:
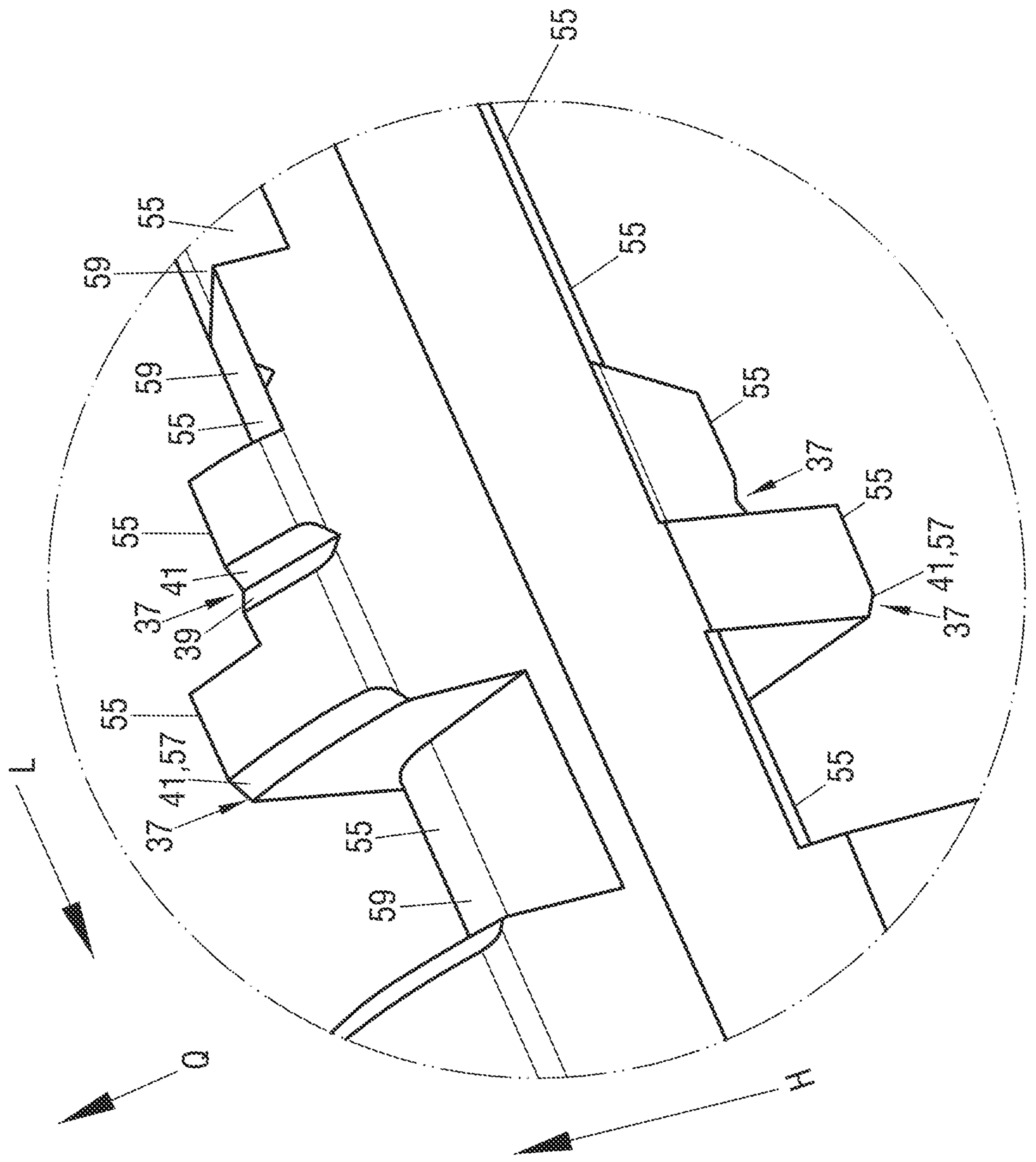

In the case of those ones of the drive slopes 55 which do not extend up to the respective back 69 or 69' or at which no chamfer 57 is formed, a notch 37 may remain at the outer side (cf. in particular FIG. 5D). The drive slopes 55 may thus have an extent along the longitudinal axis L that is greater than the spacing between two consecutive notches 37. Furthermore, two consecutive drive slopes 55 may also end at the same height with respect to the vertical axis H so that a notch 37 may remain. However, due to such notches 37 remaining at the back of the key 33, no limitations with respect to the use or handling of the key 33 result due to the inclined formation of the flanks 39 and 41 and to the small depth of the notches 37. Thus, the notches 37 do not oppose a variable coding of the key 33 by means of differently oriented and formed drive slopes 55.

The forming of notches 37 at the key blank 31 that extend transversely to the longitudinal axis L may thus make it possible in a simple manner to form chamfers 57 or bevels at the key 33 manufactured or to be manufactured from the key blank 31 and to avoid sharp edges at the backs 69 and 69' of the key shaft 35. The handling and the use of the key 33 for actuating the disk cylinder 10 may thereby be made comfortable.

The invention claimed is:

1. A key blank for manufacturing a key for a disk cylinder having rotatable disk tumblers, said key blank comprising a key shaft that extends along a longitudinal axis, wherein the key shaft has a plurality of notches, the plurality of notches extending transversely to the longitudinal axis, extending at equal spacings from one another, and having the same depth.

2. The key blank in accordance with claim 1, wherein the plurality of notches, in a direction transverse to the longitudinal axis of the key shaft, extend in a straight line or in a curved manner with respect to the longitudinal axis of the key shaft.

3. The key blank in accordance with claim 1, wherein each of the plurality of notches extends in a normal plane to the longitudinal axis of the key shaft.

4. The key blank in accordance with claim 1, wherein the plurality of notches are V-shaped in a sectional plane that extends in parallel with the longitudinal axis of the key shaft.

5. The key blank in accordance with claim 1, wherein the plurality of notches form two flanks in a sectional plane that extends in parallel with the longitudinal axis of the key shaft, said two flanks being oriented at an acute angle to the longitudinal axis of the key shaft.

6. The key blank in accordance with claim 1, wherein the key shaft has a vertical axis that extends perpendicular to the longitudinal axis of the key shaft, wherein the key shaft has a height along the vertical axis, and wherein a depth of the plurality of notches along the vertical axis of the key shaft amounts to at most 15% of the height of the key shaft.

7. The key blank in accordance with claim 1, wherein the key shaft has two mutually opposed broad sides extending along the longitudinal axis of the key shaft and two mutually opposed narrow sides extending along the longitudinal axis of the key shaft, and wherein the plurality of notches are formed at at least one of the two narrow sides of the key shaft.

8. The key blank in accordance with claim 7, wherein the at least one narrow side of the key shaft merges into one of the two broad sides at a first end section and into the other of the two broad sides at a second end section, and wherein the plurality of notches extend transversely across the at least one narrow side from the first end section to the second end section.

9. The key blank in accordance with claim 7, wherein the plurality of notches are formed at both of the two narrow sides of the key shaft, and wherein each of the plurality of notches formed at one of the two narrow sides has an associated notch formed at the other of the two narrow sides.

10. The key blank in accordance with claim 9, wherein the mutually associated notches are arranged at a same level along the longitudinal axis of the key shaft.

11. A key for actuating a disk cylinder having a plurality of rotatable disk tumblers, said key comprising a key shaft that extends along a longitudinal axis and that has a vertical axis oriented perpendicular to the longitudinal axis, wherein the key shaft has a plurality of drive slopes arranged next to one another along the longitudinal axis for driving the plurality of disk tumblers, wherein the plurality of drive slopes are aligned in parallel with the longitudinal axis of the key shaft and are oriented at different angles obliquely to the vertical axis of the key shaft, wherein the plurality of drive slopes form recesses with respect to a back of the key shaft, and wherein the back of the key shaft has chamfers that adjoin at least some of the plurality of drive slopes;

wherein the chamfers are oriented at an acute angle to the longitudinal axis of the key shaft in a sectional plane that extends in parallel with the longitudinal axis of the key shaft.

12. The key in accordance with claim 11, wherein the chamfers extend transversely to the longitudinal axis of the key shaft and are oriented obliquely to the longitudinal axis.

13. The key in accordance with claim 11, wherein the chamfers, in a direction transverse to the longitudinal axis of the key shaft, extend in a straight line or in a curved manner with respect to the longitudinal axis of the key shaft.

14. The key in accordance with claim 11, wherein each of the chamfers substantially extends in a normal plane to the longitudinal axis of the key shaft.

15. The key in accordance with claim 11, wherein the key shaft has a height along the vertical axis of the key shaft, and wherein a depth of the chamfers along the vertical axis of the key shaft amounts to at most 15% of the height of the key shaft.

16. The key in accordance with claim 11, wherein the key shaft has two mutually opposed broad sides extending along the longitudinal axis of the key shaft and two mutually opposed narrow sides extending along the longitudinal axis of the key shaft, and wherein the chamfers are formed at at least one of the two narrow sides of the key shaft.

17. A cylinder lock comprising a disk cylinder and a key, wherein the disk cylinder has a plurality of disk tumblers along a cylinder axis that are rotatable about the cylinder axis and a blocking pin that is aligned in parallel with the cylinder axis and that is displaceable radially to the cylinder axis, wherein each of the plurality of disk tumblers has a central reception opening for receiving the key and a peripheral cut-out for receiving the blocking pin;

wherein the key comprises a key shaft that extends along a longitudinal axis and that has a vertical axis oriented perpendicular to the longitudinal axis, wherein the key shaft has a plurality of drive slopes arranged next to one another along the longitudinal axis for driving the plurality of disk tumblers, wherein the plurality of drive slopes are aligned in parallel with the longitudinal axis of the key shaft and are oriented at different angles obliquely to the vertical axis of the key shaft, wherein the plurality of drive slopes form recesses with respect to a back of the key shaft, and wherein the back of the key shaft has chamfers that adjoin at least some of the plurality of drive slopes;

wherein the chamfers are oriented at an acute angle to the longitudinal axis of the key shaft in a sectional plane that extends in parallel with the longitudinal axis of the key shaft.

18. A method of manufacturing a key blank that serves for the manufacture of a key for a disk cylinder having rotatable disk tumblers, comprising the steps:

providing a key shaft that extends along a longitudinal axis; and forming a plurality of notches at the key shaft, the plurality of notches extending transversely to the longitudinal axis, extending at equal spacings from one another, and having the same depth.

19. A method of manufacturing a key for actuating a disk cylinder having a plurality of rotatable disk tumblers, comprising the steps:

providing a key shaft that extends along a longitudinal axis and that has a vertical axis oriented perpendicular to the longitudinal axis;

forming a plurality of notches at the key shaft that extend transversely to the longitudinal axis and that have the same depth; and forming a plurality of drive slopes at the key shaft, the plurality of drive slopes being arranged next to one another along the longitudinal axis, being aligned in parallel with the longitudinal axis, and being oriented at different angles obliquely to the vertical axis of the key shaft, wherein the position of the plurality of drive slopes is selected such that at least some of the plurality of drive slopes form cuts into the notches and such that at least some of the plurality of notches form chamfers adjoining the plurality of drive slopes.

* * * * *